Inventor:
Lewis A. Shaw.
By Homer C. Sweet
Attorney.

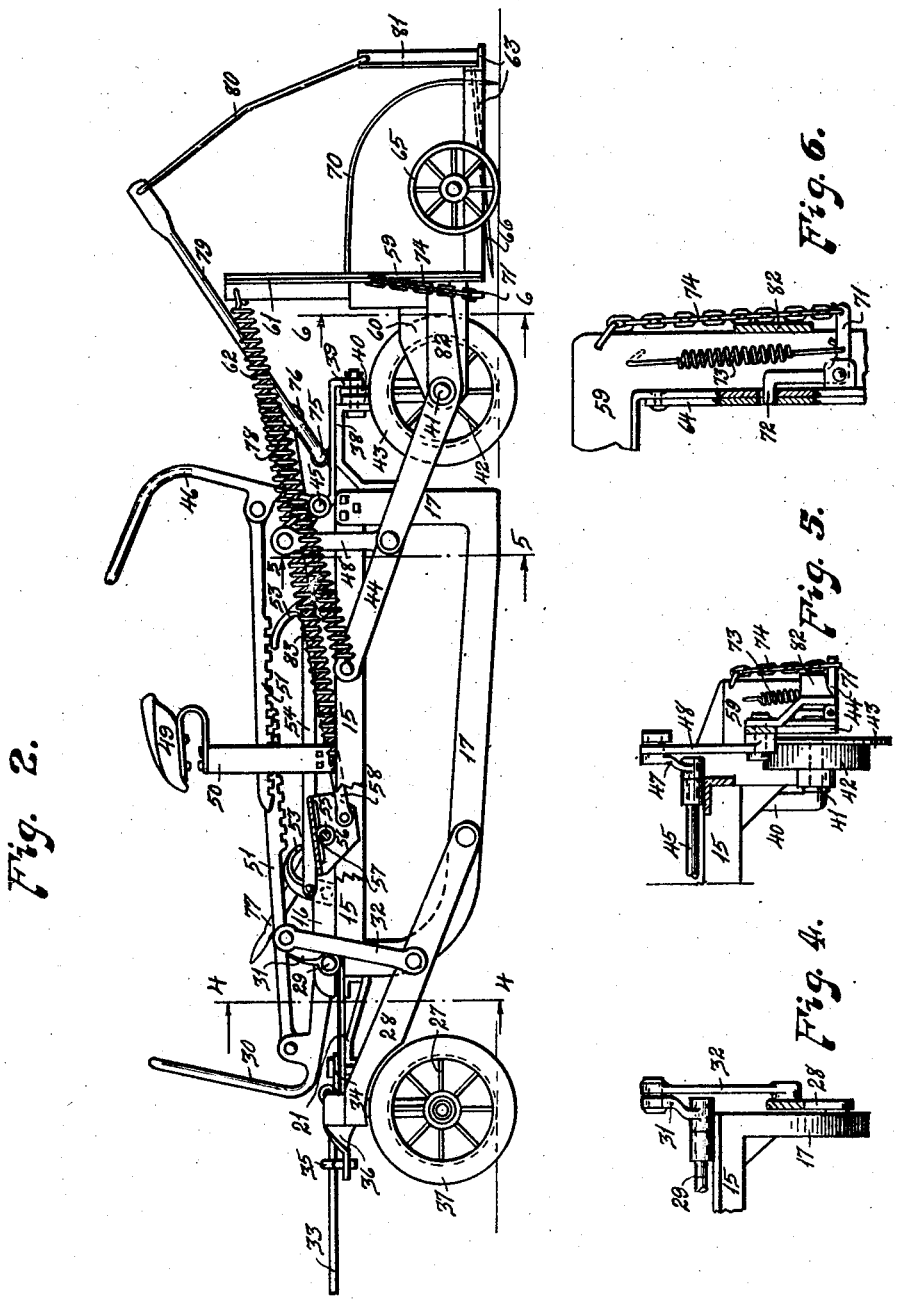

May 19, 1931.  L. A. SHAW  1,805,744
HARVESTER
Filed Aug. 19, 1929  4 Sheets-Sheet 3
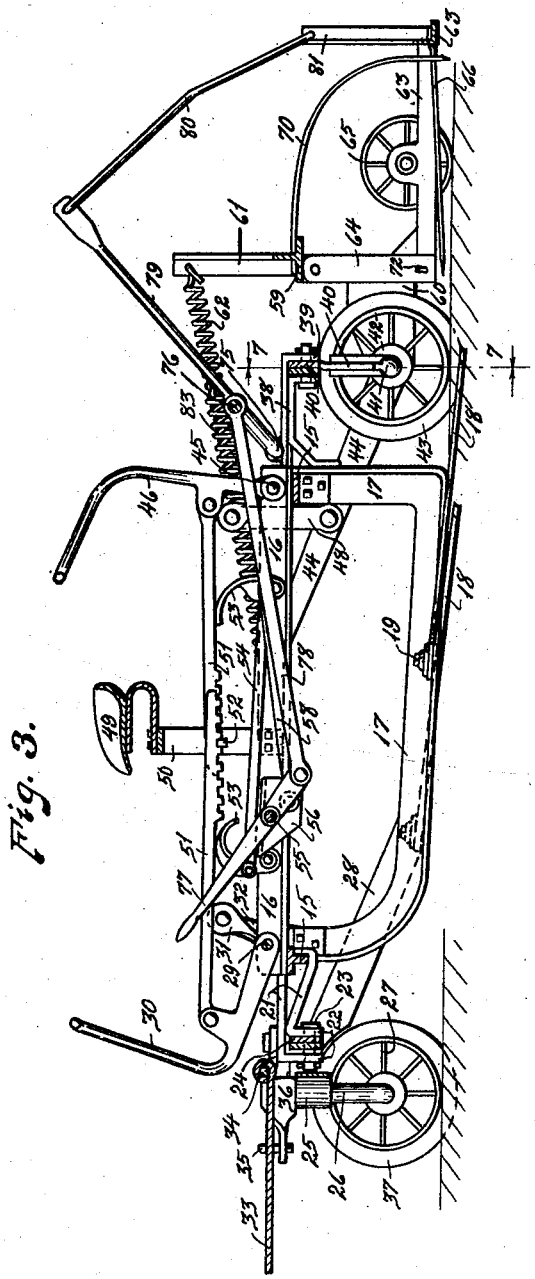
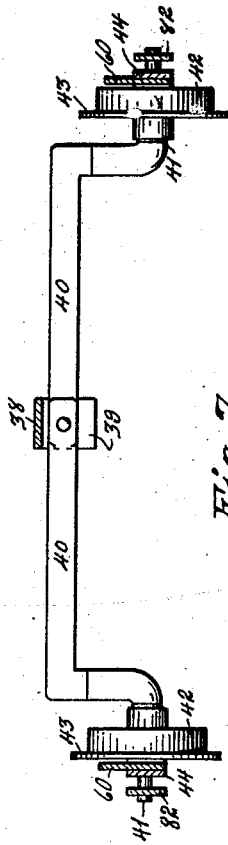
Inventor:
Lewis A. Shaw.
By Homer G. Sweet.
Attorney.

Inventor:
Lewis A. Shaw.
By Homer G. Sweet
Attorney.

Patented May 19, 1931

1,805,744

UNITED STATES PATENT OFFICE

LEWIS A. SHAW, OF WASHINGTON COUNTY, COLORADO

HARVESTER

Application filed August 19, 1929. Serial No. 386,835.

An object of this invention is to provide an improved harvester.

A further object of the invention is to provide an improved machine for the harvesting of vine crops, such as beans.

A further object of the invention is to provide a bean harvester having improved means for detaching the vines to be harvested from the ground.

A further object of the invention is to provide a bean harvester having improved vine gathering and carrying means.

A further object of the invention is to provide a bean harvester having improved means manually-operable to dump harvested vines in shocks or windrows.

A further object of the invention is to provide an improved wheeled frame for a bean harvester.

A further object of the invention is to provide improved means for altitudinally adjusting the frame of a bean harvester while in operation.

A further object of the invention is to provide improved, manually-operable means for varying the relation between the ground and the plane of the cutting elements in a bean harvester.

A further object of the invention is to provide an improved construction, shape and mounting of the gathering tines employed in a bean harvester, whereby a more complete recovery of the crop is assured with a minimum of damage due to shattering.

A further object of the invention is to provide improved means for unloading the carrier of a bean harvester during the dumping operation.

A further object of the invention is to provide an improved steering hitch for a bean harvester.

A further object of the invention is to provide a bean harvester arranged for multiple-row operation.

A further object of the invention is to provide an improved bean harvester that is simple and inexpensive of construction and operation, rugged and durable in use and positive and efficient in the harvesting operation.

My invention consists in the construction, arrangement and combination of elements hereinafter set forth, pointed out in my claims and illustrated by the accompanying drawings, in which—

Figure 1:
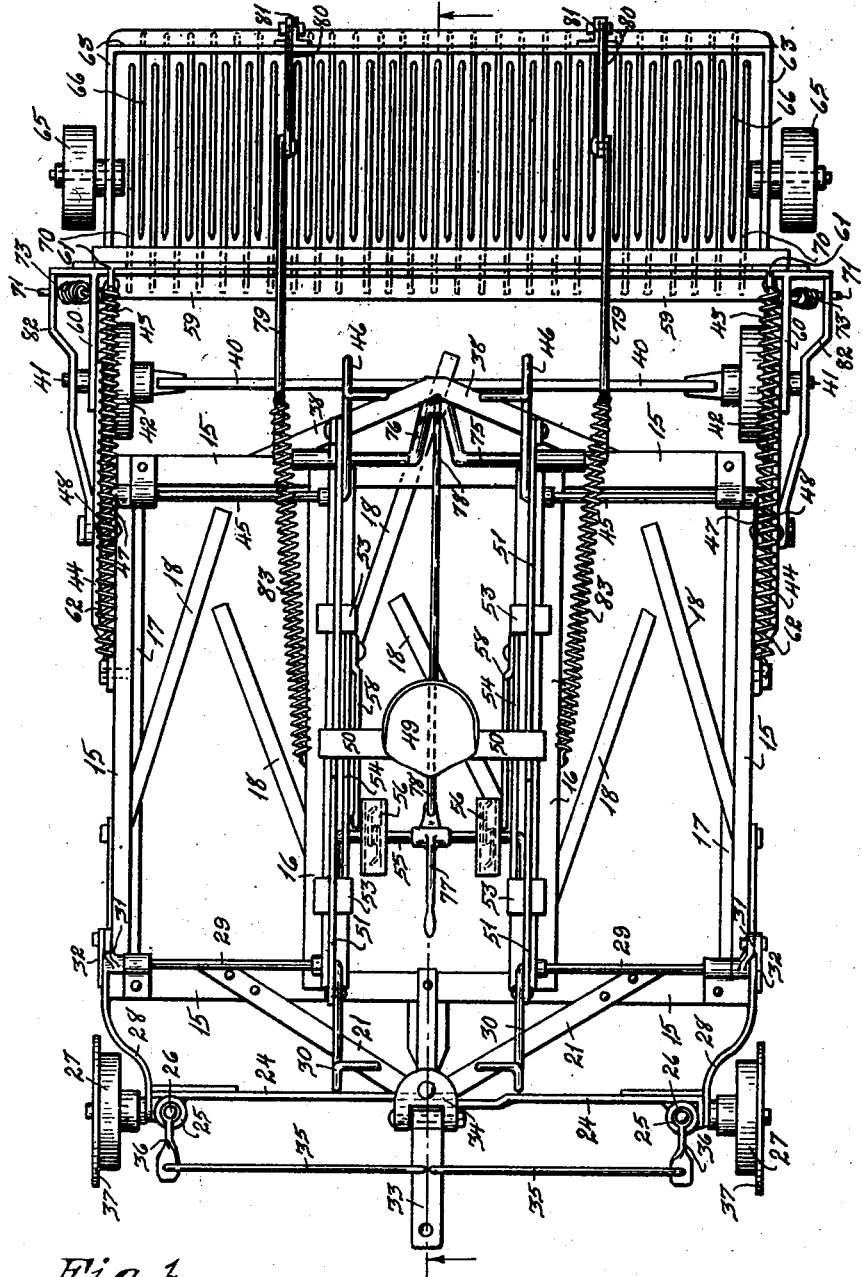
Figure 8:
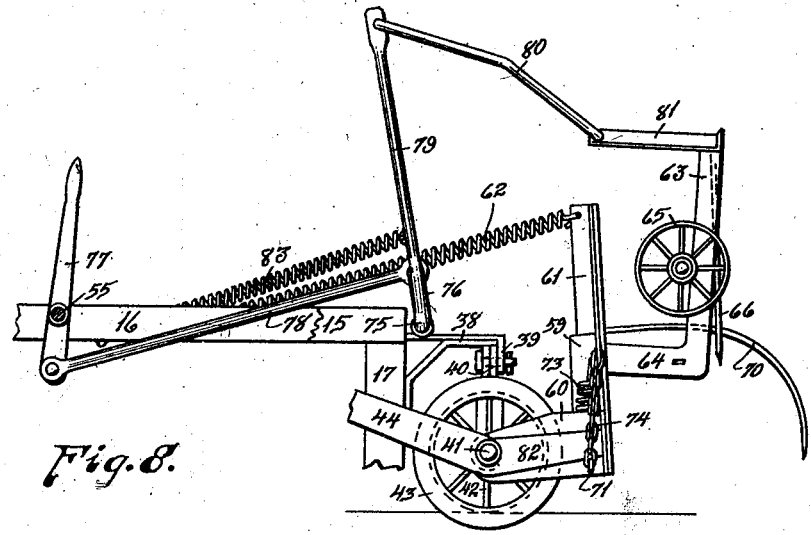
Figures 9, 10:
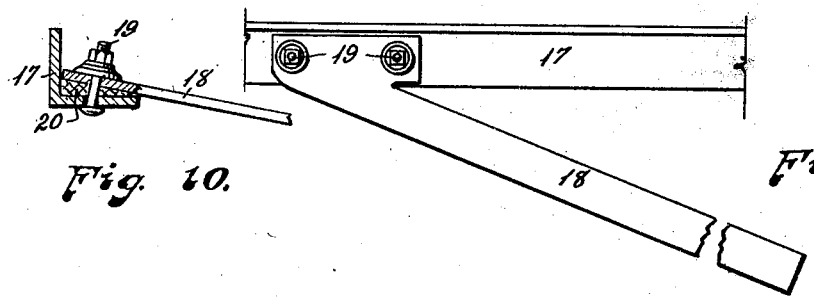
Figure 11:
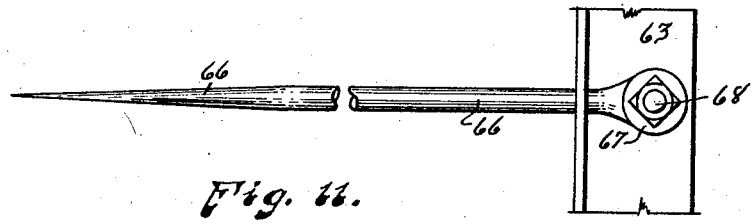
Figure 12:
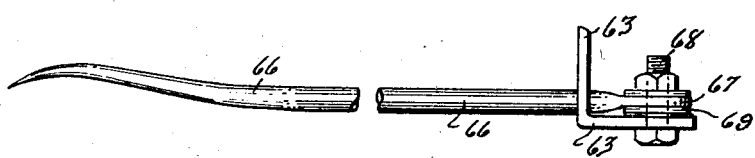

Figure 1 is a plan view of the complete harvester assembled and ready for practical use. Figure 2 is a side elevation of the showing in Figure 1, certain portions being broken away to better reveal concealed structure. Figure 3 is a vertical section on the longitudial median line of the machine as shown in Figures 1 and 2. Figure 4 is a fragmentary, detail section on the indicated line 4—4 of Figure 2. Figure 5 is a fragmentary, detail section on the indicated line 5—5 of Figure 2. Figure 6 is a fragmentary, detail section, on an enlarged scale, showing a locking mechanism employed in the machine. Figure 7 is a detail view transversely of the machine on the indicated line 7—7 of Figure 3 showing the wheel mounting employed to support the rear end of the frame. Figure 8 is a fragmentary, detail section of rear portions of the machine showing the carrier in dumping position. Figure 9 is a plan view of the cutter mounting employed in the machine. Figure 10 is a fragmentary view, partly in section, of the elements shown in Figure 9 taken on a vertical plane perpendicular to the plane of Figure 9. Figure 11 is a plan view of one of the gathering tines employed in the machine, a portion of the tine being broken away to conserve space. Figure 12 is a side elevation of the showing of Figure 11.

In the construction of the machine as shown, the numeral 15 designates a rigid, rectangular frame horizontally disposed in spaced relation above the ground and divided into bays by means of longitudinal members 16, each of said bays preferably corresponding with a row of the crop to be harvested and in the present instance being three in number. Secured at their front and rear ends to the front and rear members of the frame 15, a plurality of hangers 17 are disposed in spaced, parallel, vertical planes beneath and in depending relation with the frame 15 and in position to divide the interval between crop rows, the lower portions of said hangers being straight and positioned longitudinally beneath and substantially parallel with the longitudinal members 16 and the side members of the frame 15, the lower portions of said hangers preferably being angular or T-shaped in section and formed with laterally-extending flanges parallel with the plane of the frame 15 to support a plurality of cutter bars 18 extending from each side of and diagonally across the bays between the hangers 17. Each of the cutter bars 18 comprises a head portion adapted to overlie and be secured by means of bolts 19 to the lateral flange of one of the hangers 17 and a blade portion extending laterally and rearwardly from said head, said blade portion being of unyielding material and sharpened, if desired, to form a cutting edge and adapted to engage the stems of plants or vines closely adjacent the ground as the machine is drawn forward, cutting and breaking said stems. Any number of cutter bars 18 may be provided for each bay of the frame, but two at least are required, in which latter case the bars are secured in staggered relation to opposite sides of each bay so that each bar extends rearwardly from its support and more than half-way across its bay, thus insuring overlapping of the paths of travel of said bars to the end that no plant shall escape the cutting and breaking effect thereof. Normally, the flanges of the hangers 17 to which the bars 18 are secured are spaced but slightly above the ground, the forward ends of said hangers being curved upwardly and forwardly, as shown, to act as shoes and ride over uneven portions of the ground surface, but, when working in listed ground, or for other reasons, it may be that the hangers 17 will have to ride somewhat above the base of the plants to be harvested, in which event it may be expedient to alter the normally horizontal extension of the bars 18 and incline said bars downwardly, which may be easily done by the insertion of inclined blocks or wedges 20 between the heads of the cutter bars 18 and their supporting flanges, as is clearly shown in Figure 10.

A truss 21 is fixed to and projects forwardly from the front member of the frame 15 in the plane of said frame and terminates in an apex on the longitudinal median line of the machine to support a downwardly and laterally opening yoke 22 on said median line beneath said truss. A horizontal pin 23 extends longitudinally of the machine through the yoke 22 and pivotally supports the inner ends of similar axle members 24, said axle members extending from the yoke 22 in opposite directions, spaced from and substantially parallel with the front member of the frame 15 and being provided on their outer ends with vertical journal bearings 25 in which are pivotally received the vertical stems 26 of caster wheels 27, arms 28 being fixed at their forward ends to the outer ends of the axle members 24 and extending rearwardly and downwardly therefrom to a pivotal connection with the outer of the hangers 17. Shafts 29 are journaled for rotation on the frame 15 and extend laterally of said frame across the outer bays thereof in parallel relation with the front member of said frame, the inner ends of said shafts being spaced apart and each provided with a hand lever 30 whereby the shafts may be selectively actuated, the outer ends of said shafts 29 terminating in rearwardly-extending cranks 31 which are in turn connected by means of links 32 with midportions of the arms 28. Thus is the forward end of the frame 15 carrying the hangers 17 wheel-supported for altitudinal adjustment relative to the ground, it being obvious that rearward movement of a lever 30 will actuate its shaft 29 to exert downward pressure on the arm 28 through its link 32 and crank 31, which pressure will act, by virtue of the wheel supporting one end of the arm 28 and the pivotal connection of the other end of said arm with the hanger 17, to lift the frame 15 relative to the wheel and ground; operation of a lever 30 in a forward direction having the opposite effect and resulting in lowering of the frame 15 and hangers 17.

A steering hitch is provided for the machine in the form of a stub tongue 33 pivoted at its rear end for actuation through a vertical arc to a clevis 34, which latter is pivoted for actuation through a horizontal arc to the forward end of the truss 21 above the yoke 22, pull rods 35 connecting said stub tongue 33 forwardly of the clevis 34 with the ends of forwardly-extending cranks 36 fixed to the upper ends of the stems 26 of the caster wheels 27, so that the forward end of the stub tongue is free to move vertically without effecting the angle of the wheels 27 but acts through the cranks 36 and pull rods 35 to steer said wheels when said tongue is moved laterally of the machine, flanges 37 preferably being provided on the wheels 27 to assist in the steering operation and to resist possible side thrust of the machine resulting from the angle setting of the cutter bars 18.

In a manner similar to that above described, the rear end of the frame 15 is wheel-supported for altitudinal adjustment. A truss 38 is fixed to and projects rearwardly from the rear member of the frame 15 in the plane of said frame to support a downwardly and laterally opening yoke 39 in which are pivoted the inner ends of axle members 40 parallel with and spaced rearwardly from said rear frame member and extending laterally of said frame to terminate in substantially horizontal, fixed spindles 41 on which wheels 42 formed with annular flanges 43 are mounted for rotation in substantial alinement with the wheels 27, said spindles 41 being extended through and beyond said wheels to receive the rearward ends of arms 44 which extend forwardly and upwardly from said spindles to pivotal connection with the outer sides of the frame 15. Shafts 45 are mounted transversely of the outer bays of the frame 15 in parallel relation with the rear member of said frame, hand levers 46 being secured to the spaced, inner ends of said shafts and forwardly-extending cranks 47 are fixed to the outer ends of the shafts 45 and links 48 connect the free ends of said cranks with midportions of the arms 44, so that forward motion of either of the levers 46 will raise its respective corner of the frame 15 relative to the adjacent wheel 42 and rearward motion of said lever will lower its respective corner of the frame relative to said frame, substantially in the manner above set forth.

From the foregoing it is obvious that through the manual operation of any one of the levers 30 or 46 the corner of the frame 15 controlled by said lever may be altitudinally adjusted relative to the ground and that, by manipulating the desired combination of the levers 30 and 46 the said frame may be tilted and positioned as desired. To facilitate manipulation of the levers 30 and 46 an operator's seat 49 is positioned centrally of the machine and supported by a bridge 50 rising from the members 16 and extending across the bay between said members, the levers 30 being preferably curved rearwardly and the levers 46 curved forwardly to bring them within convenient reach of an operator. To hold the frame 15 in the desired position after it has been adjusted by the levers 30 and 46, positioning bars 51, having each a straight portion formed with square-cut marginal teeth, are hinged at one end to each of the levers 30 and 46 and extend from said levers longitudinally of the machine with their toothed portions passing through guides formed in the vertical risers of the bridge 50, the bars 51 connected with alined levers 30 and 46 passing in opposite directions through the same guide and lying side by side with their toothed portions directed downwardly in position to engage a pin 52 extending horizontally through said guide perpendicular to the plane of the riser. With this arrangement, the weight of the bars 51 will cause their teeth to engage the pins 52 and thus hold the levers 30 and 46 in their adjusted positions. It is of course necessary to lift the proper bar 51 out of its engagement with its pin 52 when the position of any of the levers 30 and 46 is to be changed, and this is accomplished through the mechanism about to be described. Lifting eccentrics 53 are pivoted to and rise from the longitudinal members 16 beneath each of the bars 51, and the pair of eccentrics 53 on each member 16 are linked together by means of a connecting rod 54 in such manner as to permit clearance between said eccentrics and their respective bars 51 when the rod 54 is parallel with its adjacent member 16, so that said bars 51 may engage the pins 52. A shaft 55 is fixed to and extends transversely of the machine between the members 16 forwardly of and beneath the seat 49 and foot treadles 56 are mounted for oscillation on said shaft adjacent each of said members 16 and normally held in substantially horizontal position by springs 57 engaging said shaft and treadles. Each of the treadles 56 is formed with a vertical web extending below the shaft 55 and links 58 connect lower portions of said webs with the rearward ends of the connecting rods 54, said links being of proper length to position the eccentrics 53 in clearing relation with the bars 51 when the treadles 56 are in horizontal or normal position as determined by the springs 57. When it is desired to manipulate one or another of the levers 30 or 46, the treadle 56 controlling the bar 51 of the desired lever is oscillated about the shaft 55 against the pressure of its spring 57, depression of the forward end of said treadle operating through the link 58 and rod 54 to move the eccentrics connected therewith rearwardly through vertical arcs, thus bringing the rearward of the eccentrics 53 into engagement with the bar 51 connected with one of the levers 46, lifting said bar from its locking relation with the pin 52 and freeing said lever, the forward of the eccentrics 53 continuing to clear its bar 51. In like manner, depression of the rearward end of either treadle 56 moves the eccentric assembly forwardly to lift one of the bars 51 connected with a lever 30 and release one of said levers. It is of course obvious that the treadles 56 may be operated simultaneously in the same or opposite directions and that said treadles will return to normal position when released under the influence of the springs 57, thereby normally positioning the eccentric assemblies in clearing relation with the bars 51.

A U-shaped frame member 59 is mounted in inverted position with its horizontal bar in parallel, spaced relation rearwardly of the rear member of the frame 15 and its vertical legs depending rearwardly of and in substantial alinement with the wheels 42, arms 60 fixed to said vertical legs extending forwardly therefrom to a pivotal connection at their forward ends with the projecting spindles 41 of the wheels 42 whereby said member 59 is mounted for actuation through a vertical arc in trailing relation with the machine. Posts 61 are fixed to and rise from the horizontal bar of the member 59 adjacent the ends of said bar and in substantial alinement with the side members of the frame 15 and retractile coil springs 62 are each secured at one end to the upper end of a post 61 and extend forwardly of the machine to suitable connections at their forward ends with the said side members of the frame 15. A second U-shaped frame member 63 is mounted in a horizontal plane with the base of the U parallel with and spaced rearwardly of and below the horizontal bar of the member 59, the legs of the member 63 extending forwardly to terminate adjacent and within the lower ends of the vertical legs of said member 59, vertical risers 64 being fixed to the forward ends of the legs of the member 63 and extending upwardly within and adjacent the legs of the member 59 to a pivotal connection at their upper ends with said latter legs adjacent the horizontal bar of the member 59, thus mounting the member 63 for actuation through a vertical arc relative to and in trailing relation with the member 59. Ground-engaging wheels 65 are pivotally mounted on spindles carried by the forwardly-extending legs of the member 63, said wheels serving to carry the weight of said member and position the same relative to the ground. The rear bar of the member 63 is preferably formed with a vertical flange and a rearwardly-extending horizontal flange, and a plurality of gathering tines 66 are adjustably mounted on said rear bar and extend in spaced, parallel relation forwardly therefrom to terminate in points beneath the member 59. As clearly shown in Figures 11 and 12, the tines 66 are each formed with an eye 67 at one end, are straight and tapered to a point in plan and in elevation have a relatively long straight portion extending forwardly from the eye 67, a shorter portion curved upwardly and forwardly and a point curved forwardly and downwardly from said latter portion. Holes of a size to receive the straight portions of the tines 66 are formed in the vertical flange of the rear bar of the member 63 and said tines are mounted through said holes and positioned with their eyes 67 in registering relation with holes opening through the horizontal flange of said rear bar, bolts 68 being passed through said latter holes and the eyes 67 to securely clamp said tines to said rear bar, washers 69 being interposed between the eyes 67 and the horizontal flange of said rear bar to provide for vertical adjustment of said eyes relative to said bar and consequent adjustment of the forward points of said tines relative to the ground, it being desirable in normal gathering operations that the points of said tines be adjusted to travel slightly under the surface of the ground, the shoe effect of the portion of the tine rearward of the point preventing undue digging of said point. The horizontal bar of the member 59 is formed as an upwardly and forwardly opening angle and tines 70 are secured in spaced, parallel relation on said bar in a manner similar to that described for the tines 66, said tines 70 extending rearwardly from the top bar of the member 59 and being curved rearwardly and downwardly to terminate in ends received between the spaced tines 66 below said latter tines and adjacent the rear bar of the member 63. Thus is a raking carrier provided for the machine, the tines 66 serving to slide under and pick the severed crop from the ground as the machine advances, said gathered crop being retained by the tines 70 for transportation to the desired point for dumping. The risers 64 are normally locked to the vertical legs of the member 59 by means of bell cranks 71 pivoted to said vertical legs and having end lugs 72 adapted to engage in registering apertures formed in said legs and risers, springs 73 connecting the free ends of said bell cranks with fixed portions of said legs to normally hold the lugs 72 in engaging relation within said apertures and a chain or similar flexible connection 74 is provided between the fixed portion of said legs and the free end of each bell crank 71 of a length sufficient to permit disengagement of said lugs 72 from the apertures and yet limit the oscillation of each bell crank about its pivot. A shaft 75, having a central offset or crank-throw 76, is mounted for oscillation in bearings carried by the rear member of the frame 15, said crank-throw 76 being operatively connected with a hand lever 77 carried on the shaft 55 by means of a pull rod 78, and arms 79 are fixed to outer ends of the shaft 75 and extend upwardly and rearwardly therefrom to overhang the carrier above described, the free ends of said arms 79 being linked by means of rods 80 to the upper ends of risers 81 fixed to the rear bar of the member 63 and rising therefrom, so that rearward manipulation of the lever 77 oscillates the shaft 75 to swing the arms 79 forwardly of the machine through vertical arcs and thus, by virtue of the rods 80 and risers 81, lifts the carrier, the tension of the springs 62 materially assisting in the lifting operation. Since the legs of the member 59 and risers 64 are locked together by the bell cranks 71, manipulation of the lever 77 first lifts the entire carrier assembly about the pivotal connection of the arms 60 with the spindles 41, this operation being continued until the lower ends of the tines 70 are sufficiently spaced above the ground whereupon the free ends of the bell cranks 71 engage stop arms 82 fixed to and extending rearwardly above said bell crank ends from the arms 44, which engagement operates to oscillate said bell cranks against the tension of the springs 73 and withdraw the lugs 72 from their locking position in the apertures above described. After the member 63 is thus unlocked from the member 59, further upward progress of the latter is arrested by the limiting effect of the connections 74 on the bell cranks 71 and the member 59 is held in its raised position by the tension of the springs 62, continued manipulation of the lever 77 raising the member 63 to the position shown in Figure 8 and drawing the tines 66 upwardly and almost entirely through between the tines 70 to rake the former tines clear of their burden and completely dump the carrier; reversal of the above steps returning the member 63 to its normally horizontal position and locking it again with the member 59. The arms 79, rods 80 and risers 81 are in substantial alinement with the frame members 16 and each of said arms 79 is yieldingly connected by means of a retractile coil spring 83 with its adjacent frame member 16, it being the function of the springs 83 to assist in the lifting of the member 63 and thus obviate excessive loads on the lever 77 and further to maintain the member 63 in its elevated position and avoid the necessity for a detent and quadrant to position the operating lever, it being obvious that when the member 63 is in lowered position the springs 83 can exert but little lifting effect due to the angle of the arms 79, the leverage of said springs relative to said arms increasing as the member 63 is raised.

It will be evident from the drawings and foregoing description that I have produced a harvester having many advantages and especially adapted for the harvesting of bean and related crops with a minimum of crop loss and damage. However, since many changes of form and construction of the elements illustrated and above described may be had without departing from the spirit of my invention, I wish to be understood as being limited solely by the scope of the appended claims rather than by the illustrative showing and foregoing description.

I claim as my invention—

1. A harvester comprising a rigid frame, wheels supporting and altitudinally adjustable relative to said frame, manually-operable means carried by said frame for selective altitudinal adjustment of said wheels, a toothed raking frame in trailing relation laterally of said first frame and manually operable through a longitudinal vertical arc relative to said frame, a toothed, wheel-supported, lifting frame in cooperating relation with said raking frame and pivotally secured thereto, manually-operable means for moving both said raking frame and said lifting frame through a vertical arc relative to said first frame and means for limiting the vertical movement of said raking frame and continuing the vertical movement of said lifting frame relative to said raking frame.

2. In a harvester having a rigid frame, wheels supporting said frame and manually-operable means for selective, altitudinal adjustment of said wheels relative to said frame, a manually-dumpable, raking carrier laterally of and in trailing relation with said wheeled frame, said carrier comprising a toothed lifting unit in pivoted, cooperating relation with a toothed raking unit, means for interlocking said lifting and raking units when in gathering position and manually-operable means carried by said frame for actuating said interlocked units through a limited vertical arc relative to said frame to automatically unlock said units and continue the arcuate movement of said lifting unit relative to said raking unit.

3. In a harvester having a manually-operable, dumping carrier including a raking unit and a lifting unit arranged for coacting operation, means for interlocking said units, said means comprising alined, pivotally interconnected, normally adjacent structural members on said raking unit and said lifting unit, normally registering apertures in said structural members, a bell crank pivoted on one of said structural members and formed with a lug adapted to engage in and extend through said registering apertures and a spring engaging said bell crank and operable to normally position said lug in and through said apertures.

4. In a harvester having a raking unit and a lifting unit arranged for coacting operation and manual actuation through a vertical arc and normally interlocked by means of a spring-pressed bell crank engaging through registering apertures in adjacent, alined structural members of said units, means for automatically breaking the interlock between said structural members as said units are moved through a common vertical arc, said means comprising a fixed stop arm in the path of travel of the free end of said bell crank and adapted to engage said free end of said bell crank and oscillate the latter against the pressure of its spring to withdraw the other arm of said bell crank from its engaging position within said registering apertures; together with manually-operable means whereby said lifting unit may be further moved through a vertical arc relative to said raking unit after the interlock between said units has been broken.

5. The combination with a harvester having a rigid frame, wheels supporting said frame and altitudinally adjustable relative thereto and manually-operable means carried by said frame for controlling the altitudinal adjustment of said wheels, of a two-section, dumping carrier laterally of and in trailing relation with said frame, said carrier being mounted for simultaneous, interlocked actuation of both its sections through a limited vertical arc longitudinally of said frame and for independent, unlocked actuation of one of its sections through a further vertical arc relative to said frame and the other section; together with automatic, interengaging, locking means carried by said carrier sections, automatic means carried by said frame for breaking the interlock between said sections as the latter are moved through a common arc and manually-operable means carried by said frame for moving said sections through their respective arcs.

Signed at Denver, in the county of Denver and State of Colorado, this second day of April, 1929.

LEWIS A. SHAW.